(12) United States Patent
Sato et al.

(10) Patent No.: US 8,217,132 B2
(45) Date of Patent: Jul. 10, 2012

(54) SILICONE RUBBER COMPOSITION

(75) Inventors: Takeshi Sato, Kanagawa (JP); Masaya Otsuka, Kumamoto (JP); Masashi Kudo, Kanagawa (JP)

(73) Assignee: NOK Corporation, Tokyo (JP)

( * ) Notice: Subject to any disclaimer, the term of this patent is extended or adjusted under 35 U.S.C. 154(b) by 57 days.

(21) Appl. No.: 12/308,913

(22) PCT Filed: Jun. 15, 2007

(86) PCT No.: PCT/JP2007/062098
§ 371 (c)(1),
(2), (4) Date: Dec. 29, 2008

(87) PCT Pub. No.: WO2008/001625
PCT Pub. Date: Jan. 3, 2008

(65) Prior Publication Data
US 2009/0326122 A1 Dec. 31, 2009

(30) Foreign Application Priority Data
Jun. 27, 2006 (JP) .................................. 2006-176247

(51) Int. Cl.
*C08G 77/20* (2006.01)
*C08G 77/04* (2006.01)
*C08G 77/08* (2006.01)
*C08G 77/24* (2006.01)

(52) U.S. Cl. ................. 528/36; 528/10; 528/24; 528/32

(58) Field of Classification Search .................... 524/588
See application file for complete search history.

(56) References Cited

U.S. PATENT DOCUMENTS

| | | | | |
|---|---|---|---|---|
| 3,642,685 | A * | 2/1972 | Matherly ..................... | 524/785 |
| 3,836,623 | A * | 9/1974 | Matherly ..................... | 264/267 |
| 4,029,629 | A * | 6/1977 | Jeram ......................... | 523/203 |
| 4,101,499 | A * | 7/1978 | Herzig ........................ | 524/731 |
| 4,355,121 | A * | 10/1982 | Evans .......................... | 523/213 |
| 4,454,288 | A * | 6/1984 | Lee et al. ..................... | 524/588 |
| 4,529,774 | A * | 7/1985 | Evans et al. ................. | 523/217 |
| 4,585,848 | A * | 4/1986 | Evans et al. ................. | 528/15 |
| 4,649,005 | A * | 3/1987 | Kobayashi et al. .......... | 264/101 |
| 4,766,191 | A * | 8/1988 | Gvozdic et al. ............. | 528/14 |
| 4,785,047 | A * | 11/1988 | Jensen ......................... | 524/714 |
| 5,008,305 | A * | 4/1991 | Kennan et al. ............... | 523/212 |
| 5,057,151 | A * | 10/1991 | Schuster et al. ............. | 106/2 |
| 5,110,845 | A * | 5/1992 | Gray et al. .................. | 523/211 |
| 5,399,602 | A * | 3/1995 | Matsushita et al. .......... | 524/267 |
| 5,405,896 | A * | 4/1995 | Fujiki et al. ................. | 524/265 |
| 5,418,065 | A * | 5/1995 | Fujiki et al. ................. | 428/451 |
| 5,610,218 | A * | 3/1997 | Funk et al. ................... | 524/413 |
| 5,623,028 | A * | 4/1997 | Fitzgerald et al. ........... | 525/474 |
| 5,792,812 | A * | 8/1998 | Fujiki et al. ................. | 525/105 |
| 5,824,736 | A * | 10/1998 | Kobayashi et al. .......... | 524/588 |
| 5,866,653 | A * | 2/1999 | Matsushita et al. .......... | 524/731 |
| 6,127,503 | A * | 10/2000 | Fujioka et al. ............... | 528/15 |
| 6,130,272 | A * | 10/2000 | Dopp et al. .................. | 523/212 |
| 6,162,854 | A * | 12/2000 | Meguriya et al. ............ | 524/437 |
| 6,284,861 | B1 * | 9/2001 | Takuman et al. ............ | 528/31 |
| 6,303,675 | B1 * | 10/2001 | Kobayashi et al. .......... | 524/263 |
| 6,369,155 | B1 * | 4/2002 | Takita ........................... | 524/588 |
| 6,890,662 | B2 * | 5/2005 | Yaginuma et al. ........... | 428/447 |
| 7,271,215 | B2 * | 9/2007 | Ikeno et al. .................. | 524/588 |
| 7,288,322 | B2 * | 10/2007 | Bosshammer ............... | 428/447 |
| 2001/0034403 | A1 * | 10/2001 | Takuman et al. ............ | 524/588 |
| 2002/0016412 | A1 * | 2/2002 | Hirai et al. .................. | 525/100 |
| 2002/0077440 | A1 * | 6/2002 | Baba et al. ................... | 528/10 |
| 2003/0055157 | A1 * | 3/2003 | Wolfer et al. ................ | 524/588 |
| 2004/0235994 | A1 | 11/2004 | Okamoto et al. | |

FOREIGN PATENT DOCUMENTS

| | | |
|---|---|---|
| CN | 1314435 A | 9/2001 |
| JP | 63-218764 | 9/1988 |
| JP | 05-017688 | 1/1993 |
| JP | 06-287304 | 10/1994 |
| JP | 2003-028302 | 1/2003 |
| JP | 2004-076870 | 3/2004 |
| WO | WO 2008/013319 | 1/2008 |

OTHER PUBLICATIONS

European Search Report from corresponding European Application No. 07745353.8 dated Mar. 24, 2010, 3 pages.

* cited by examiner

*Primary Examiner* — Robert S Loewe
(74) *Attorney, Agent, or Firm* — Brinks Hofer Gilson & Lione

(57) ABSTRACT

A silicone rubber composition, which comprises 100 parts by weight of a vinyl group-introduced methylfluoroalkylvinyl-based silicone rubber obtained by copolymerization of a dimethylsiloxane copolymerization unit as the main component with 5-50% by mole of a methylfluoroalkylsiloxane copolymerization unit, and 0.2-8 parts by weight of an organic peroxide. When silica is used as a filler, it is desirable to use a surfactant for silica, and water at the same time. The present silicone rubber composition can give distinguished low-temperature characteristics and blister resistance, and thus can be used for seal materials directed to high-pressure hydrogen gas storage tanks, for example, to storage under 70 MPa, and particularly as suitable vulcanization-molding materials for O-rings, packings, gaskets, oil seals, valves, etc. High-pressure gases for storage are not limited only to hydrogen gas, but also to oxygen gas, nitrogen gas, helium gas, etc. likewise.

5 Claims, No Drawings

SILICONE RUBBER COMPOSITION

RELATED APPLICATIONS

The present application is a 35 U.S.C. §371 national stage filing of International Patent Application No. PCT/JP2007/062098, filed Jun. 15, 2007, to which priority is claimed under 35 U.S.C. §120 and through which priority is claimed under 35 U.S.C. §119 to Japanese Priority Patent Application No. 2006-176247, filed Jun. 27, 2006.

TECHNICAL FIELD

The present invention relates to a silicone rubber composition, and more particularly to a silicone rubber composition for suitable use to vulcanization-molding materials, etc. of seal materials for high-pressure gas, particularly high-pressure hydrogen gas.

BACKGROUND ART

Due to recent energy problems such as possible exhaustion petroleum resources, etc., efficient fuel cells have been now brought into the limelight. The fuel cell is a system of generating electricity by reaction of hydrogen with oxygen, where how to store hydrogen is a problem. Up to now, how to store hydrogen under high-pressure, how to store hydrogen by adsorption onto a metal, how to reform hydrocarbon to recover hydrogen, etc. have been proposed. Storage of hydrogen gas under high-pressure must take a tank storage form.

Now, tanks capable of withstanding a hydrogen gas storage pressure of about 35 MPa are generally used, but cannot satisfy a sufficient mileage when the fuel cells are to be mounted on automobiles. Thus, storage under much higher-pressure, for example, about 70 MPa, has been now under study. Seals are indispensable for storage of hydrogen gas in a tank, and now metallic seals, EPDM rubber seals, etc. have been proposed, but in the present situation the metallic seals have a poor maintainability, whereas the EPDM rubber seals have a poor reliability.

Functions generally required for a high-pressure gas seal are an unbreakability due to pressure increases or pressure reduction (no occurrence of blisters) and a maintainability of rubbery elasticity even if exposed to extremely low temperatures by adiabatic expansion due to an abrupt pressure reduction. For example, it is known that CNG (compressed natural gas: about 20 MPa) known as a high-pressure fuel gas undergoes a temperature decrease down to about −60° C. by adiabatic expansion when subjected to abrupt pressure reduction. In view of this fact, it seems necessary that the rubbery elasticity must be maintained even at −60° C. or lower, because the hydrogen gas is stored under higher pressure than that of CNG. However, EPDM as now mainly used can maintain a satisfactory rubbery elasticity down to about −50° C., and thus has unsatisfactory low-temperature characteristics.

Seal materials in a tight seal structure capable of sustaining tight sealing of high-pressure gases such as high-pressure hydrogen gas, etc., so far used, include, for example, butyl rubber, fluororubber, hydrogenated nitrile rubber, tetrafluoroethylene-perfluoro(alkyl vinyl ether) copolymer, etc., as disclosed in the following Patent Literatures 1 and 2. However, these rubber materials for forming seal materials are not preferable, because of deterioration of sealability at low temperatures. Furthermore, at least butyl rubber, fluororubber, and hydrogenated nitrile rubber have a problem of blister occurrence, when subjected to abrupt pressure reduction.
Patent Literature 1: JP-A-2003-28302
Patent Literature 2: JP-A-2004-76870

Silicone rubber is also known as rubber having distinguished low-temperature characteristics, where polydimethylsiloxane having a small amount of vinyl groups as crosslinkable groups, most typical silicone rubber, has a low-temperature resistance down to about −55° C., and thus has no satisfactory low-temperature characteristics, whereas methylfluoroalkylvinyl-based silicone rubber has an effective low-temperature resistance down to about −70° C., but has a problem of blister occurrence when subjected to abrupt pressure reduction.

The present applicants have so far proposed a silicone rubber composition, which comprises: (a) diorganopolysiloxane copolymer comprising (i) about 5 to about 40% by mole of $(CF_3CH_2CH_2)_a(R)_b SiO_c$ and (ii) about 95 to about 60% by mole of $R_{(a+b)}SiO_c$ as unit formulae, where R is methyl, ethyl, vinyl or phenyl group, (b) diatomaceous earth, (c) finely powdery silica, (d) titanium oxide and carbonate or oxide of Mn, Zn, Mg, Ca or Fe, (e) graphite, (f) fluororesin, (g) carbon black, and (h) an organic peroxide, which is disclosed to have distinguished heat resistance and oil resistance, and to be applicable effectively to mold seal materials.
Patent Literature 3: JP No. 2,049,956

It is further disclosed therein that in the afore-mentioned unit (i), a $(CF_3CH_2CH_2)(CH_3)SiO$ unit and a $(CF_3CH_2CH_2)(C_2H_5)SiO$ unit can be used as preferable copolymerization units, and in the unit (ii), a $(CF_3)_2SiO$ unit can be used so, and the copolymer molecule chain terminals may be blocked by a triorganosilyl group, etc. such as a trimethylsilyl group, a dimethylvinylsilyl group, a methylvinylphenylsilyl group, etc. It is stated that vulcanization-molding products of the composition can be effectively applied to various packings, sealing materials, etc. in the field relating to machines and transporting machinery, but no mention has been made therein as to application to high-pressure gas sealing materials requiring good low-temperature characteristics and blister resistance.

DISCLOSURE OF THE INVENTION

Problem to be Solved by the Invention

The object of the present invention is to provide a rubber composition for suitable use as vulcanization-molding materials for seal materials, etc. of high-pressure hydrogen gas storage tank, for example, to storage under 70 MPa, having distinguished low-temperature characteristics and blister resistance.

Means for Solving the Problem

The object of the present invention can be attained by a silicone rubber composition, which comprises 100 parts by weight of vinyl group-introduced methylfluoroalkylvinyl-based silicone rubber obtained by copolymerization of dimethylsiloxane copolymerization units as the main component with 5-50 mol. % of methylfluoroalkylsiloxane copolymerization units, and 0.2-8 parts by weight of an organic peroxide. Introduction of vinyl groups to the silicone rubber can be carried out generally by copolymerization of the silicone rubber with 0.1-5 mol. % of methylvinylsiloxane. When silica is used as a filler, it is preferable to use a surfactant for the silica, and water together.

Effect of the Invention

Homopolymer of methylvinylsiloxane or methylfluoroalkylvinylsiloxane cannot satisfy both of the necessary low-temperature characteristics and blister resistance at the same time, whereas the present silicone rubber composition comprising the copolymer of the methylvinylsiloxane and methylfluoroalkylvinylsiloxane can give such distinguished low-temperature characteristics as to allow use even at −80° C. and also a distinguished blister resistance at the same time. Owing to distinguished low-temperature characteristics and blister resistance, the present silicone rubber composition can be used as a suitable seal material for high-pressure hydrogen gas storage tanks, for example, to storage under 70 MPa, and specifically as suitable vulcanization-molding materials for O rings, packings, gaskets, oil seals, valves, etc. The high-pressure gas to be stored includes not only a hydrogen gas, but also, e.g. an oxygen gas, a nitrogen gas, a helium gas, etc. The present invention is directed to application to a high-pressure gas under 1 MPa or higher as a measure of the pressure resistance, and a distinguished pressure-resistant sealability can be attained particularly under 35 MPa or higher, as set forth in the storage tank specification, for example, under the service conditions of 70 MPa, as mentioned above.

When silica is also used as a filler, it is preferable to use a surfactant for the silica, and water together. Simultaneous use of water is effective for further prevention of blister occurrence.

BEST MODES FOR CARRYING OUT THE INVENTION

The methylfluoroalkylvinyl-based silicone rubber for use in the present invention is a silicone rubber, which comprises dimethylsiloxane copolymerization units as the main component, a methylfluoroalkylsiloxane copolymerization units, for example, γ,γ,γ-trifluoropropylmethylsiloxane ($CF_3CH_2CH_2$)($CH_3$)SiO copolymerization unit, (5-50 mol. %, preferably 20-40 mol. %, based on 100 mol. % of total), copolymerized with the former copolymerization units, and further a small amount (about 0.1 to about 5 mol. %, preferably about 0.5 to about 3 mol. %, and about 1 mol. % in Examples and Comparative Examples, based on 100 mol. % of total) of a vinyl group as a cross-linkable group, derived from methylvinylsiloxane ($CH_2$=CH)($CH_3$)SiO copolymerization units, etc. So long as the copolymerization proportion of the methylfluoroalkylsiloxane copolymerization units is within 5-50 mol. %, the methylfluoroalkylvinyl-based silicone rubber can have a glass transition temperature Tg of −80° to −120° C., and can be used at extremely low-temperatures without any blister occurrence even if subjected to abrupt pressure reduction, whereas when the copolymerization proportion of the methylfluoroalkylsiloxane copolymerization units is outside the above-defined range, the resulting silicone rubber has a glass transition temperature Tg of about −70° C. at the lowest, and cannot always be used at extremely low-temperatures, where the blister resistance is often not satisfactory. As the silicone rubber having a copolymer composition as set forth above, commercially available products such as X-30-7811U, etc. of Shin-Etsu Silicone products, can be practically used as such.

The methylfluoroalkylvinyl-based silicone rubber can be vulcanized (cross-linked) by an organic peroxide. Any organic peroxide can be used without any particular restriction, so long as it can be generally used in rubber, and includes, for example, benzoyl peroxide, p-chlorobenzoyl peroxide, 2,4-dichlorobenzoyl peroxide, di-t-butyl peroxide, t-butyl cumyl peroxide, dicumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexine-3,1,3-di(t-butylperoxyisopropyl)-benzene, 2,5-dimethyl-2,5-di(benzoylperoxy)hexane, t-butylperoxy benzoate, t-butylperoxyisopropyl carbonate, n-butyl-4,4-di(t-butylperoxy) valerate, etc.

The organic peroxide can be used in a proportion of 0.2-8 parts by weight, preferably 1-5 parts by weight, on the basis of 100 parts by weight of silicone rubber. When the organic peroxide is used in a proportion of less than 0.2 parts by weight, any satisfactory cross-linking density cannot be obtained, whereas in a proportion of more than 8 parts by weight, foaming will take place, resulting in a failure to obtain vulcanization products or if obtained the rubbery elasticity or elongation will be lowered.

The silicone rubber composition can further contain, if required, besides the foregoing essential components, a reinforcing agent such as carbon black, silica, etc., a filler such as talc, clay, graphite, calcium silicate, etc., a processing aid such as stearic acid, palmitic acid, paraffin wax, etc., an acid acceptor such as zinc oxide, magnesium oxide, etc., an antioxidant, a plasticizer, etc., so far used generally as rubber compounding agents, appropriately.

Silica can be used as a reinforcing agent in a proportion of not more than 120 parts by weight, preferably about 50 to about 120 parts by weight, on the basis of 100 parts by weight of methylfluoroalkylvinyl-based silicone rubber. When silica is used, it is desirable to use together with not more than about 12 parts by weight, preferably about 2 to about 8 parts by weight, of a surfactant such as hexamethylsilazane, etc. on the basis of 100 parts by weight of silica, where the blisters will be hard to occur by using not more than about 50 wt. %, preferably about 10 to about 30 wt. % of water on the basis of the weight of the surfactant at the same time.

The present composition can be prepared by kneading through a kneader such as intermix, kneader, Banbury mixer, etc. or open rolls, etc., and vulcanization-molding can be carried out generally by heating at about 150° to about 200° C. for about 3 to about 60 minutes through an injection molding machine, a compression molding machine, a vulcanization press, etc., and if required, oven heating (secondary vulcanization) can be carried out by heating at about 150° to about 250° C. for about 1 to about 24 hours.

EXAMPLES

The present invention will be described in detail below, referring to Examples.

Example 1

|  | Parts by weight |
| --- | --- |
| Methylfluoroalkylvinyl-based silicone rubber (copolymerization proportion of γ,γ,γ-trifluoropropylmethylsiloxane copolymerization units: 30 mol. %) | 100 |
| Silica | 70 |
| Hexamethyldisilazane (surfactant for silica compounding) | 5 |
| Distilled water | 1 |
| 2,5-dimethyl-2,5-di(t-butylperoxy) hexane | 2 |

The foregoing components were kneaded through a kneader and open rolls, and the resulting kneading product was press vulcanized at 170° C. for 20 minutes, and oven vulcanized (secondary vulcanization) at 200° C. for 4 hours to produce vulcanized sheets (150 mm×150 mm×2 mm) and G25 size rings (inner diameter: 24.4 mm, wire diameter: 3.1 mm).

The resulting vulcanizates were subjected to determination of the following items:
Normal state physical properties: according to JIS K6253 and K6251 corresponding to ASTM D2240 and D412
Low-temperature characteristics: TR test according to JIS K6261 corresponding to ASTM D1329, and determination of glass transition temperature
Blister test: Visual determination of blister occurrence or not by placing the test samples into a hydrogen gas atmosphere or helium gas atmosphere under 70 MPa at 25° C. for 5 hours, followed by pressure reduction down to the normal atmospheric pressure within 5 second Example 2

In Example 1, the same amount of methylfluoroalkylvinyl-based silicone rubber, a copolymerization proportion of whose γ,γ,γ-trifluoropropylmethylsiloxane copolymerization is 50 mol. %, was used as the silicone rubber, while the amount of silica was changed to 70 parts by weight.

Example 3

In Example 1, the same amount of methylfluoroalkylvinyl-based silicone rubber, a copolymerization proportion of whose γ,γ,γ-trifluoropropylmethylsiloxane is 10 mol. %, was used as the silicone rubber, while the amount of silica was changed to 90 parts by weight, and neither hexamethyldisilazane nor distilled water was used.

Comparative Example 1

In Example 1, the same amount of methylvinylsiloxane homopolymerization silicone rubber (KE971-U, a product of Shin-Etsu Silicone product) was used as the silicone rubber, while the amount of silica was changed to 95 parts by weight.

Comparative Example 2

In Example 1, the same amount of methylfluoroalkylvinyl-siloxane homopolymerization silicone rubber (FE271-U, a Shin-Etsu Silicone product) was used as the silicone rubber, while the amount of silica was changed to 40 parts by weight.

Comparative Example 3

In Example 1, the same amount of methylfluoroalkylvinyl-based silicone rubber, a copolymerization proportion of whose γ,γ,γ-trifluoropropylmethylsiloxane copolymerization unit is 70 mol. %, was used as the silicone rubber, while the amount of silica was changed to 60 parts by weight.

Comparative Example 4

In Example 1, the amount of organic peroxide was changed to 0.1 part by weight. At the stage of just prepared compound (unvulcanizated state), foaming took place, resulting in failure to conduct molding.

Comparative Example 5

In Example 1, the amount of organic peroxide was changed to 10 parts by weight. The vulcanization sheet underwent foaming, resulting in failure to conduct molding.

Results obtained in the foregoing Examples and Comparative Examples (excluding Comparative Examples 4 and 5) are shown in the following Table.

TABLE

| Item of determination evaluation | Ex. 1 | Ex. 2 | Ex. 3 | Comp. Ex. 1 | Comp. Ex. 2 | Comp. Ex. 3 |
|---|---|---|---|---|---|---|
| Normal state physical properties | | | | | | |
| Hardness (Duro A) | 70 | 70 | 71 | 71 | 69 | 70 |
| Tensile strength (MPa) | 8.20 | 8.53 | 8.44 | 8.78 | 10.3 | 8.69 |
| Elongation at break (%) | 250 | 270 | 240 | 220 | 250 | 250 |
| Low-temp. Characteristics | | | | | | |
| TR-10 (° C.) | <−85 | −80 | −68 | −50 | −63 | −57 |
| Glass transition temp. Tg (° C.) | −120 | −98 | −80 | −61 | −70 | −72 |
| Blister test | | | | | | |
| Blister generation | | | | | | |
| $H_2$ | None | None | None | None | Yes | None |
| He | None | None | None | None | Yes | None |

It can be seen from the foregoing results that all the Examples are satisfactory in both of the low-temperature characteristics and blister test, whereas Comparative Examples 1 and 3 are not satisfactory in the low-temperature characteristics and Comparative Example 2 is not satisfactory in the blister resistance.

The invention claimed is:
1. A silicone rubber composition that is used as a vulcanization-molding material for a high-pressure gas seal material, which silicon rubber composition comprises 100 parts by weight of vinyl group-introduced methylfluoroalkylvinyl-based silicone rubber obtained by copolymerization of dimethylsiloxane copolymerization units as the main component with 5-50 mol. % of a methylfluoroalkylsiloxane copolymerization unit, and 0.5-5% by mole of methylvinylsiloxane copolymerization unit, 50-120 parts by weight of silica as a reinforcing agent, 2-12 parts by weight of hexamethyldisilazane as a surfactant for compounding the silica on the basis of 100 parts by weight of the silica, 10-30% by weight of water on the basis of the weight of the surfactant for compounding the silica, and 0.2-8 parts by weight of an organic peroxide selected from benzoyl peroxide, p-chlorobenzoyl peroxide, 2,4-dichlorobenzoyl peroxide, di-t-butyl peroxide, t-butyl cumyl peroxide, dicumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexine-3, 1,3-di(t-butylperoxyisopropyl)-benzene, 2,5-dimethyl-2,5-di(benzoylperoxy)hexane, t-butylperoxy benzoate, and n-butyl-4,4-di(t-butylperoxy) valerate.

2. A silicone rubber composition according to claim 1, wherein the silicone rubber is used whose methylfluoroalkylsiloxane copolymerization unit is a γ,γ,γ-trifluoropropylmethylsiloxane copolymerization unit.

3. A silicone rubber composition according to claim 1, wherein 2-8 parts by weight of the hexamethyldisilazane is used on the basis of 100 parts by weight of silica.

4. A high-pressure gas seal material vulcanization-molded from a silicone rubber composition according to claim 1.

5. A high-pressure gas seal material according to claim 4, for use as a high pressure hydrogen gas seal material.

\* \* \* \* \*